June 22, 1965 T. B. EDWARDS 3,191,080
CONTINUOUS TORQUE TWO GEAR RATIO ELECTRIC MOTOR
Filed June 8, 1962 4 Sheets-Sheet 1

INVENTOR.
THEODORIC B. EDWARDS
BY
*George F. Wasserman*
ATTORNEY

INVENTOR.
THEODORIC B. EDWARDS
BY
ATTORNEY

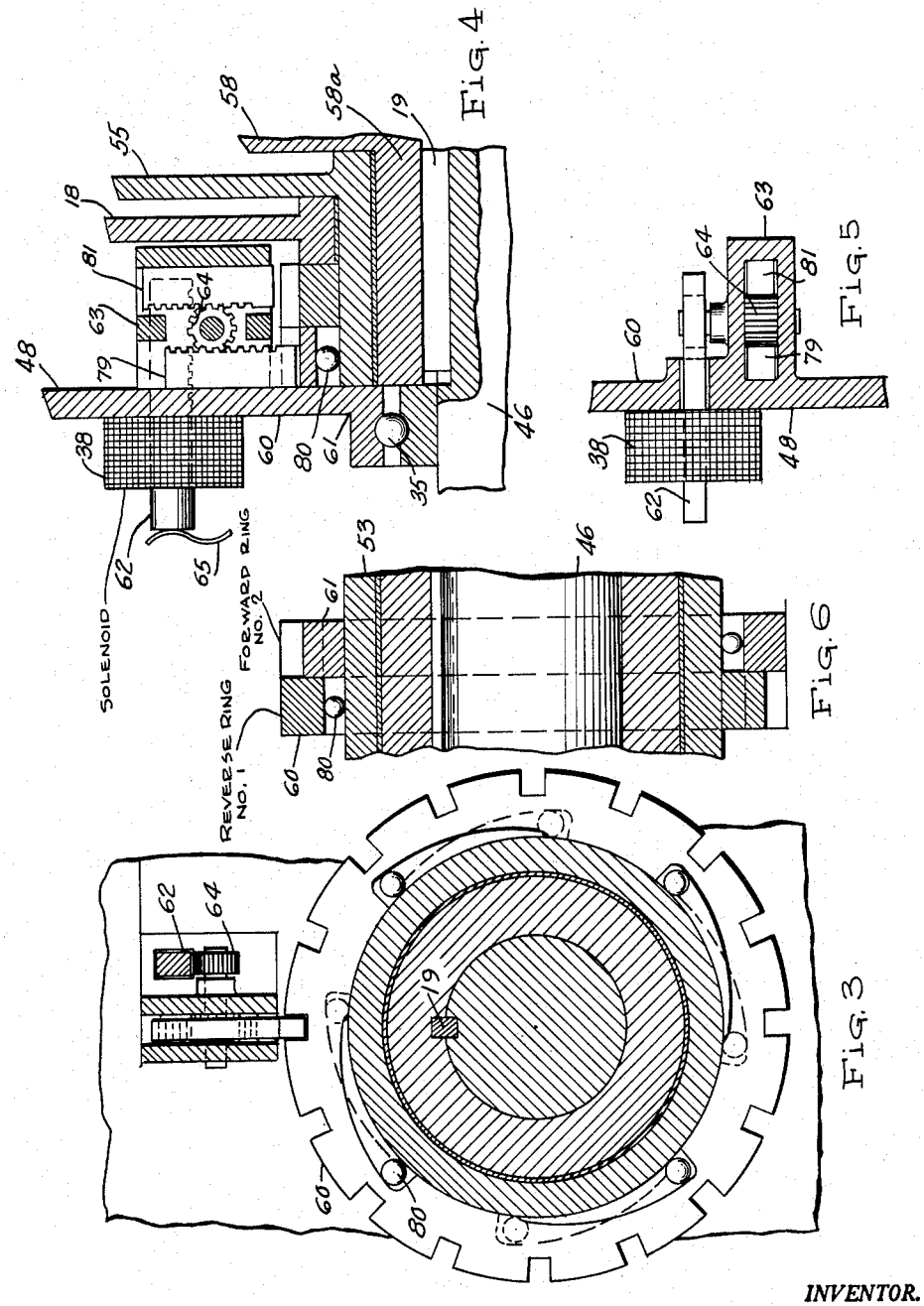

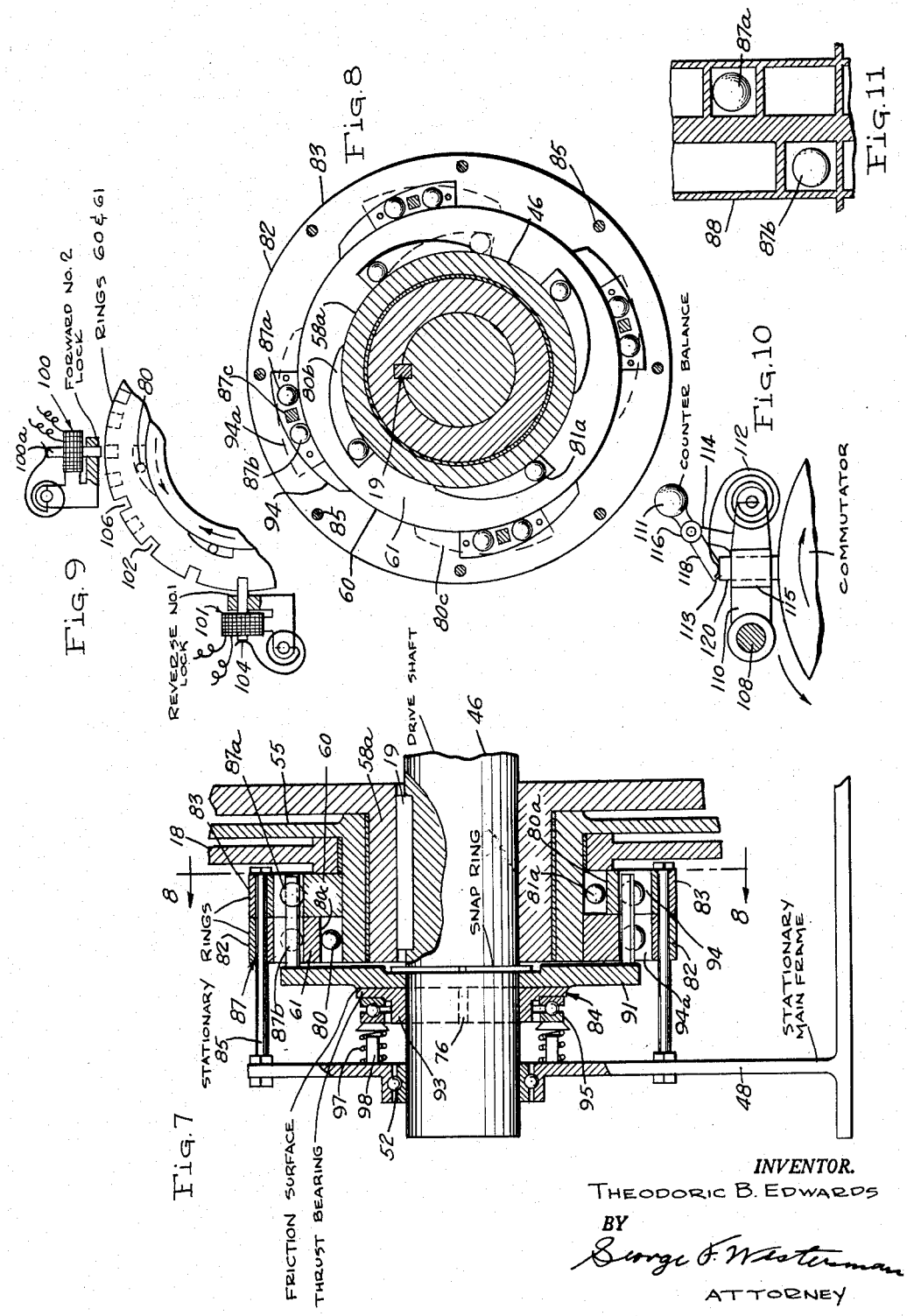

3,191,080
CONTINUOUS TORQUE TWO GEAR RATIO ELECTRIC MOTOR
Theodoric B. Edwards, 5311 Neptune Drive, Alexandria, Va.; Helen M. Edwards, executrix of said Theodoric B. Edwards, deceased
Filed June 8, 1962, Ser. No. 201,218
1 Claim. (Cl. 310—118)
(Granted under Title 35, U.S. Code (1952), sec. 266)

The invention described herein may be manufactured and used by or for the Government for governmental purposes without the payment to me of any royalty thereon.

This invention relates in general to improvements in electrical drives for motors used to propel off-road vehicular equipment.

In railway equipment the standard motor is entirely adequate to provide both maximum torque and maximum speeds. In off-road vehicular equipment, however, these requirements must be accomplished by other than a direct motor drive. With the direct current series motor which is most suited for such applications the maximum torque is limited by electrical factors, size and the maximum speed by centrifugal force effects. The purposes outlined above can be accomplished by one of many forms of gear shift devices, but for the application indicated above they all suffer from an insurmountable objection, the torque has to pass through zero in order to change the ratio. With an electric drive this would require means for prevention of overspeeding of the motor and other complications of such a nature as to render the arrangement unworkable. This invention accomplishes these purposes smoothly without undue complication with an overrunning brake and direct drive to the armature shaft of the driving motor.

This invention relates more specifically to electric motors in the application of electric drives to off-road vehicles, the improvement of which resides in a novel means of automatically employing two gear ratios between the motor and the final driven member without interruption of torque between the motor and wheels.

The invention will become more apparent from a consideration of the accompanying drawings, constituting a part hereof, in which like reference characters designate like parts, and in which:

FIG. 3 is a sectional view of FIG. 2 taken on line 3—3 looking in the direction of the arrows;

FIG. 4 is an enlarged sectional view of the solenoid actuated detent means of FIG. 2;

FIG. 5 is a plan view of the detent means of FIG. 4;

FIG. 6 is a sectional view taken through reverse ring and forward ring of FIG. 3;

FIG. 7 is a partial sectional view of another embodiment of the invention;

FIG. 8 is a sectional view of the camming rings taken on line 8—8 of FIG. 7;

FIG. 9 shows a partial view of a modified form of detent means for each forward and reverse locking ring;

FIG. 10 shows a brush and support means connected to a pivoted counterweight bar having a camming surface in contact with the brush, which action counteracts centrifugal force on the brush means as the motor field is rotated; and FIG. 11 shows a partial sectional view of an alternate cage arrangement for the locking rings of FIG. 7.

Figure 1:
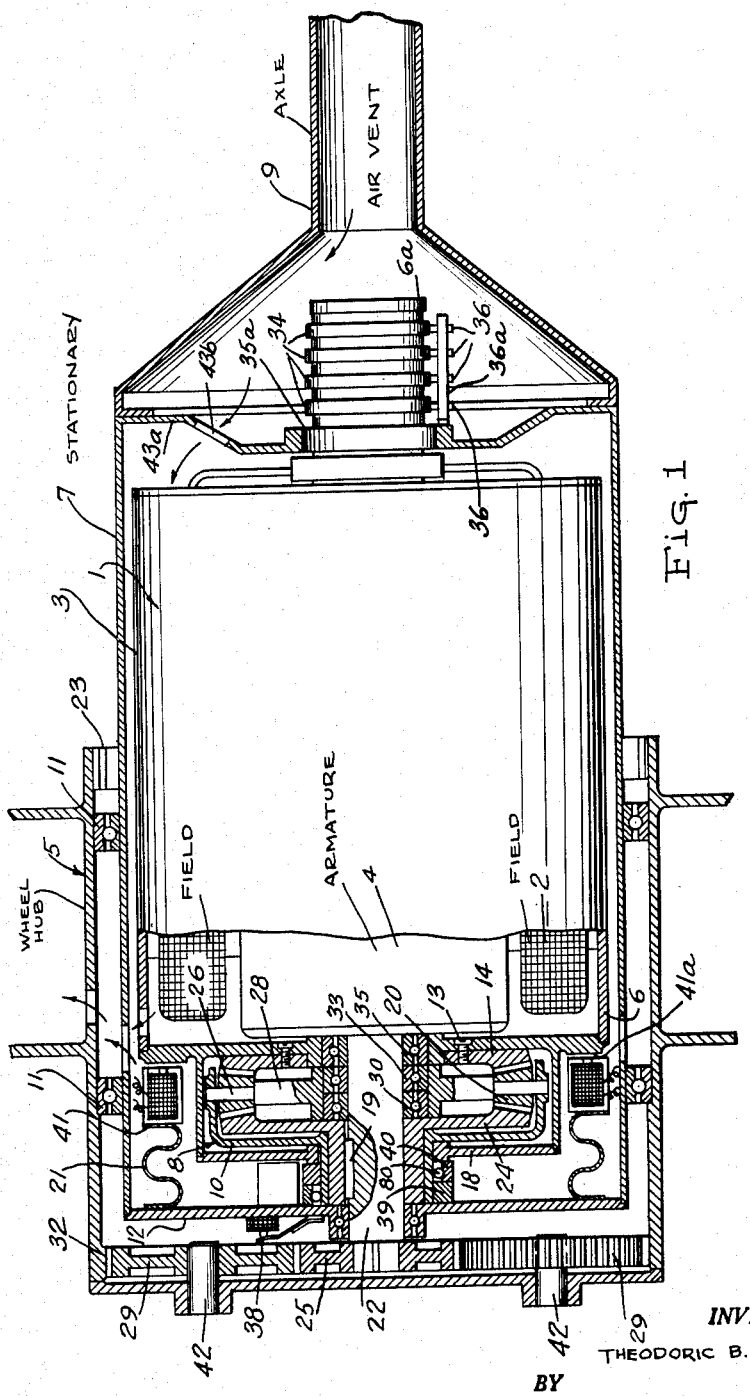
FIG. 1 is a partial sectional view showing an application of the invention.

FIG. 1 shows the assembly of the motor mounted on the vehicle wheel hub 5. The device consists of an electric motor 1 having field means 2, and armature means 4 contained by enclosure cage means 6. Motor 1 as shown, is of a series type, but may be of an alternating or other direct current type. Motor 1 is different from the conventional type in that both the armature 4 and field means 2 are free to turn in opposite directions by interconnecting differential gear means 8. Differential gear means 8, consists in general of flanged ring gear 24 secured to armature shaft 22 by key means 19 or other suitable means, ring gear 14 secured by bolt means 13 (or other suitable means) to cage means 6 of motor field housing means 3 and floating pinion gears 20 carried by spider pinion shaft means 28 terminating as pinion bearing shaft means 26 and cage means 10. Ring gears 14 and 24 are selectively interconnected by pinion gears 20 through operator command of solenoid operation of camming ball 80 means of rings 39 and 40 interacting with cage 10 to prevent rotation of cage means 10 as similarly shown in FIG. 3. Pinion gears 20 are supported on the armature shaft 22 by floating pedestal or spider plural pinion shaft means 28 supported on bearing means 30 and are interconnected by pinion bearing shaft means 26 of spider 28 and connected to floating control cage means 10.

The mode of operation including rotation of cage means 10 is selectively controlled by camming means of rings 39 and 40 by ball camming or detent means contacting sleeve or flange portion of cage 10 which detent means is actuated by a cam surface interior of the surface of rings 39 and 40 when either of these rings is selectively prevented from rotation by solenoid actuated detent means 38, as will be hereinafter more fully described in connection with the operation of FIG. 3, 4, 5, 6 and 9.

In FIG. 1, the wheel hub means 5 is mounted by bearing means 11 externally on enlarged stationary axle portion 7. Wheel brake means 23 is used as a conventional braking means for the vehicle and is not necessarily a part of the invention. Armature shaft 22 is attached by key, spline or other suitable means to gear 25 as a driving means of the motor 1. Shaft 22 of armature 4 is connected by driving gear 25 and spur gears 29 on bearing supports 42, to ring gear 32 secured to wheel hub 5 to permit positive driving of the vehicle wheel by armature 4 of motor 1. The entire assembly of field 2 and armature 4 is free to rotate in bearings 30, 33, 35 and 35a. Current for operation of the motor is supplied through collector rings 34 and brushes 36. Collector ring means 34 are rigidly secured to motor housing extension 6a. Collector ring brush means 36 are supported by support means 36a secured to bearing support partition member 44 of the enlarged stationary axle portion 7 of axle means 9. Brush means 36 may be energized by leads to any suitable external electrical source as shown by leads 48b of FIG. 2. Operation for high gear is obtained by solenoid actuated detent means 38 engaging either locking ring 39 or locking ring 40, depending upon the desired direction of rotation of hub means 5.

For low gear operation, solenoid actuated detent means 38 of FIG. 1 is selectively disengaged from both locking or camming rings 39 and 40 which permits the field structure 2 to rotate in opposite direction to armature 4. If it were not for the magnetic brake structure 41 and braking surface 41a, the field structure 2 of motor 1 would eventually rotate at the full speed (or revolutions per minute) as that of the motor 1 in which instance the armature 4 would be standing still thereby transmitting no torque through shaft 22. The magnetic brake structure for automatic operation may be energized by a suitable current source at a predetermined speed of the motor field. In general, the differential gear means 8 of FIG. 1 revolves in the same direction as armature shaft 22 until the field and armature are both revolving in opposite directions at the same speed when cage member 10 is stationary at which speed the output shaft is turning at half speed of motor 1 with twice the amount of torque when in high gear. In order for the field structure to move faster than the armature, the differential cage or flange member 10 must reverse its direction and rotate in the opposite direction to that of the rotation of the armature. Were it not for the magnetic brake means 41 there would not be a positive control for continuous torque output during low gear operation.

For high gear operation, the solenoid actuated detent means 38 of FIG. 1, is engaged with either locking ring 39 or locking ring 40, depending upon the desired direction of rotation of hub means 5. During high gear operation the magnetic brake 41 (supported by spring 21 and end plate member 12 of axle 7) is continually energized and field means 2 is locked by magnetic brake 41 against rotation which permits shaft 22 to revolve at the normal speed of the motor 1. During this operation, gear 24 rotates with armature shaft 22 through differential action of pinion gears 20; cage 10 and spider means 28 to rotate in the same direction as the shaft 22.

For dissipation of the heat generated in FIG. 1 by motor 1, axle 9 is used as an air vent in which air from an independent source (not shown) may be passed through aperture 43b of bearing support partition 43a.

If a series motor is used, the motor will operate at any desired speed depending upon load conditions. The motor under such conditions may be made to operate effectively at twice full speed without overstressing any parts due to centrifugal force.

Figure 2:
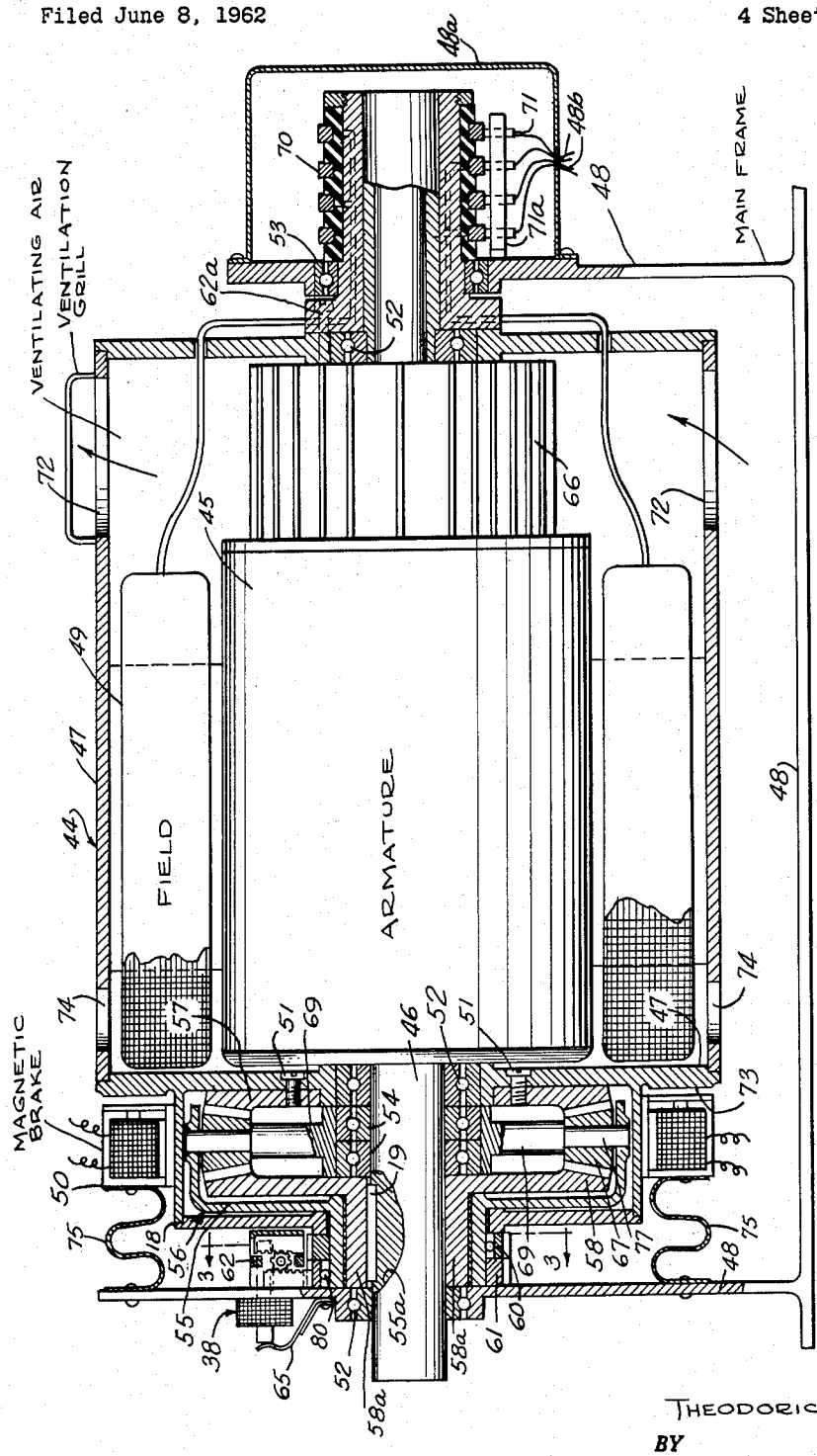
FIG. 2 is a partial sectional view of a modification of the invention.

FIG. 2 is a modification of the invention and comprises in general, motor 44, stationary mounting means 48 (which may be part of the chassis of a driven vehicle), motor housing means 47, field means 49, armature means 45 mounted on shaft means 46, differential gear means 56, magnetic brake means 50 supported on spring means 75 with braking surface 73 and solenoid actuated ring detent means 38. FIG. 2 is similar in parts and differential gear operation to FIG. 1, except that armature shaft 46 may be used as a direct drive for a wheel of a vehicle.

The differential gear means 56 of FIG. 2, in general, consists of flanged ring gear means 58 keyed by member 19 to armature shaft 46, ring gear means 57 secured to motor field housing means 47 by bolt means 51 and pinion gears 67 supported by pinion shaft means 77 of spider means 69 connected to flanged spider cage means 55. Flanged cage means 55 may be selectively constrained from rotating in either a forward or reverse direction by rings 60 and 61 having locked ball camming detent means similar to FIG. 1 and as shown in FIG. 3, to engage the flanged portion 55a of cage means 55 in response to the selective locking from rotation of either one of rings 60 or 61 by a pawl of the solenoid actuated detent means 38 engaging a longitudinal groove in the outer circumferential portion of either ring as selected by a command from the operator.

In FIG. 2, magnetic brake means 50 is supported by spring means 75 secured to mounting means 48 and is used in the same manner cooperating with differential gear means 56, solenoid ring detent means 38 and camming rings 60 and 61 similar to magnetic brake means 41 of FIG. 1 as stated hereinbefore. Motor field housing 47 is rotatably supported by duplicate bearings 52 on armature shaft 46. Collector ring means 70 is secured to motor housing 47 by bolt means 62a shown in dotted outline of FIG. 2. Brush means 71 are supported by support means 71a secured to mounting means 48. The motor field means 49 and armature 45 are each free to rotate independently on bearings 53 and 52, respectively. Spider means 69 carries pinion gear shaft means 77 and is supported on armature shaft 46 by bearings 54. Cage means 55 is supported on arcuate flange means 58a of gear 58.

Current for operation of motor 44 of FIG. 2 is supplied through brushes 71 and collector rings 70 by leads to any suitable external electrical source as shown by leads 48b.

While the motor field braking means of FIGS. 1, 2 and 7 associated with the differential gear means of the drawings is shown as a magnetic brake, it is to be understood, that this braking means is not restricted to a magnetic brake but may include mechanical, hydraulic or other suitable braking means for locking the field structure of the motor against rotation.

For low gear operation, FIG. 2, solenoid actuated ring detent means 38 is disengaged from both locking rings 60 and 61 which by differential gear means 56 permits motor field structure 49 to rotate in opposite direction to armature means 45. Magnetic brake means 50, as in FIG. 1, is selectively used by operator to restrain rotation of the motor field means so as not to permit the field to reach the rotational speed of the motor and allow the armature shaft 46 to stand still transmitting no driving torque to the vehicle. The magnetic brake structure 50 for automatic operation may be energized by a suitable current source at a predetermined speed of the motor field by any suitable conventional centrifugal governor or motor speed switch means (not shown) as may be used also in FIGS. 1 and 7.

For high gear operation, FIG. 2, solenoid actuated detent means 38 is engaged with either of cam locking rings 60 or 61, depending upon the desired direction of rotation of armature shaft 46. During high gear operation the magnetic brake 50 is continually energized and field housing means 47 is locked against rotation which permits armature shaft 46 to revolve at the normal rotational speed of the motor 44.

For dissipation of heat generated in FIG. 2 by motor 44, fan means 66, of any desired type and as shown diagrammatically, is used to draw in external air through openings 72 and expel the air through openings 74 in motor housing 47.

Collector rings 70 and brushes 71 are not a part of the internal brushes, commutator contacts or collection rings of motor 44 but merely serve as a means to supply power to motor 44 when both motor field means 49 and armature means 45 may be rotating with respect to each other during low gear operation.

FIGS. 3, 4, 5 and 6 illustrate the obvious means of operation of solenoid actuated detent means 38 and cam locking rings of FIGS. 1 and 2 as described hereinbefore. Referring to FIG. 2, solenoid actuated detent means 38 comprises a spring bias means 65, solenoid plunger and rack means 62, housing means 63, double pinion gear means 64, reverse locking pawl rack 79, forward ring locking pawl rack 81, reverse camming ring 60, forward camming ring 61, cage means 55, flange means 58a of ring gear 58, armature shaft 46, key means 19, ball bearing means 35, and gear housing means 18. Solenoid actuated detent means 38 selectively engages either pawl rack 79 or 81 to lock the desired camming ring on command of the operator.

FIG. 7 illustrates another embodiment of the invention which discloses an automatic means of control of the external stationary camming rings 82 and 83 supplemented by a friction clutch means 84. For example, by using a field reversing switch (not shown) for motor 44 the operator can control the direction of rotation of the motor in high gear operation and if the field is locked by action of the magnetic brakes, as in FIG. 2, cage detent means 87 will selectively lock the left external camming ring 82 by ball detent means 87b and inner camming surface means 94 of this ring shown in FIG. 8, against the inner cooperating camming ring 61 which in turn will selectively engage and restrain from rotation the flange portion of spider cage means 55 of the differential gear means 56, as in FIG. 2 for high gear operation. Likewise, the operator may reverse the direction of rotation of motor 44 and cage detent means 87 will actuate ball camming detent means 87a to lockingly engage inner camming surface of ring 60 which also by ball detent means 81a will engage and restrain spider cage means 55 from rotating in high gear operation. The friction clutch means 84 of FIG. 7, in general, comprises friction bearing clutch plate 91 terminating in ball detent means 87b and friction bearing plate 93 slidably keyed to shaft 46 by key 76. Bearing plate 93 is spring biased against the friction surface of clutch plate 91 by clutch bearing means 95, spring means 97 and pin retaining means 98 for spring means 97. Pin means 98 may be attached to stationary mounting means 48 in any desired manner. Motor shaft 46 is supported in structural member 48 by bearing means 52. Stationary rings 82 and 83 are rigidly retained by bolt means 85 or other desired means secured to stationary frame structure 48.

FIG. 8 is a cross sectional view of rotatable camming rings 60 and 61, and stationary camming rings 82 and 83 with detent means of FIG. 7 taken at section 8—8 looking in direction of the arrows which more clearly show the camming interrelation between ball means 87a of cage means 87c and camming surface 94 of forward stationary ring 83 with outer surface of ring 60 which in turn by ball detent means 81a and camming surface 80a cams or locks with the outer surface of flange means 58a of cage means 55 as described in FIG. 7. FIG. 8 likewise discloses for reverse rotation of motor the camming interrelation of stationary ring 82 with respect to camming ball means 87b of cage means 87c with camming surface 94 of ring 82 and outer surface of ring 61 which in turn by ball means 80 and cam surface 80c engages flange means 58a of cage means 55.

FIG. 9 discloses separate solenoid actuated detent locking means 100 and 101 for each of camming rings 60 and 61. Each solenoid actuated detent plunger means 100a or 104 are spring biased open and are engaged by longitudinal slot means 106 of rings 60 and 61 by solenoid action to lock either of rings 60 and 61 against rotation by command of the operator.

FIG. 10 illustrates a new brush retaining means for motor commutator when the motor field rotates relative to armature during low gear operation when the motor is driven in only one direction of rotation as in FIGS. 1 and 2. In case of the use of a D.C. motor as in FIG. 1, the brushes would tend to leave the commutator due to centrifugal force when the motor field rotates as described above in low gear operation. The structure of FIG. 10 insures proper brush contact with commutator at all times. FIG. 10 comprises a pivoted stud 108 for support of a bar means 110 which has a brush receiving casing 115 intermediate its ends. Bar means 110 is supported at one end by stud 108 and spring biased at the other end by spring means 112. Bar means 110 also has an extending arm 114 which terminates in pivot means 116 which pivotally carries a secondary bar means 118 pivoted intermediate its ends by a secondary pivot means 116. The secondary bar 118 at one end has a counterweight portion 111 and at the other end has a cam surface portion 113 which contacts brush 120 and counteracts centrifugal force on brush means 120 as the motor field is rotated.

FIG. 11 is an alternate cage means 88 for retaining in proper spaced relationship the ball detent means 87a and 87b for contact with camming surfaces 94 and 94a of stationary rings 82 and 83, respectively. Stationary rings 82 and 83 are held in position by spacing and outer surfaces of rings 60 and 61, bolt means 85 attached to stationary frame means 48, as shown in FIG. 7.

While there have been described what are at present considered to be the preferred embodiments of the invention, it will be obvious to those skilled in the art that various changes and modifications may be made therein without departing from the invention.

I claim:

In an electric motor and drive means, the combination comprising: a frame means; an armature and shaft means rotatably mounted on said frame means; a field means rotatably mounted on said shaft means; brake means connected to said frame means and applicable to said field means; differential gear means including first bevel gear means rigidly connected to said field means, second bevel gear means rigidly connected to said shaft, bevel pinion means connecting said first and second bevel gear means, spider means rotatably mounted on said shaft and a flanged spider cage means mounted for rotation about said shaft, pinion shaft means mounted on said spider means and connected to said spider cage means, said bevel pinion means rotatably mounted on said pinion shaft means; and detent means for securing said flanged spider cage to said frame means upon application of said braking means to said field means.

References Cited by the Examiner

UNITED STATES PATENTS

| | | | |
|---|---|---|---|
| 865,732 | 9/07 | Vandervell et al. | 310—123 |
| 1,179,779 | 4/16 | Uhl | 310—118 X |
| 2,564,741 | 8/51 | Vermillion | 310—118 |
| 2,672,566 | 3/54 | Heins | 310—123 X |
| 2,696,585 | 12/54 | Vermillion | 322—47 |
| 2,971,402 | 2/61 | Lovercheck | 74—675 |

MILTON O. HIRSHFIELD, *Primary Examiner.*